United States Patent [19]

Shigemori

[11] Patent Number: 5,241,521

[45] Date of Patent: Aug. 31, 1993

[54] OPTICAL DISK DRIVING APPARATUS

[75] Inventor: Toshihiro Shigemori, Machida, Japan

[73] Assignee: Ricoh Company, Ltd., Tokyo, Japan

[21] Appl. No.: 704,458

[22] Filed: May 23, 1991

[30] Foreign Application Priority Data

Jun. 12, 1990 [JP] Japan ............................ 2-153452

[51] Int. Cl.[5] .............................................. G11B 17/22
[52] U.S. Cl. .................................. 369/32; 369/54;
369/58; 360/53
[58] Field of Search .................. 369/32, 54, 58, 48,
369/44.28, 44.34, 44.32, 59, 53, 44.26, 124;
360/31, 53, 72.2, 40, 48

[56] References Cited

U.S. PATENT DOCUMENTS 5,132,956 7/1992 Ichikawa ............................ 369/54
5,142,515 8/1992 McFerrin et al. .................. 369/32

FOREIGN PATENT DOCUMENTS 0177537 10/1983 Japan .
215734 12/1983 Japan .

Primary Examiner—Robert J. Pascal
Assistant Examiner—Ali Neyzari
Attorney, Agent, or Firm—Cooper & Dunham

[57] ABSTRACT

In an optical disk driving apparatus using an optical disk, a sector address in a set address sequence is sequentially provided in a pre-format in an address recognizing section of each sector. The driving apparatus has a reader for reading the sector address provided in the pre-format out of the optical disk; an error detector for detecting an error in sector address read by the reader; and a device for setting a value of the read sector address as sector address data when there is no error in the read sector address. The setting device sets a value of the next sector address as the sector address data on the basis of the set address sequence from data of a sector address just before the read sector address when there is the error in the read sector address. The driving apparatus is constructed such that data are written and read out of the optical disk based on the sector address data. The error detector judges the relation between the sector address read in the present sector and a sector address read in a sector located before the present sector by one or plural sectors, and detects the error in sector address by conformity and nonconformity between this relation and the set address sequence.

3 Claims, 3 Drawing Sheets

OPTICAL DISK DRIVING APPARATUS

BACKGROUND OF THE INVENTION

1. Field of the Invention

The present invention relates to an optical disk driving apparatus provided with a means for detecting a sector address.

2. Description of the Related Art

A general magnetic disk processor has a high reliability in operation since an error rate of a recording medium is low. Accordingly, there is no problem about recognition of an address recognizing section (an ID section) when data are written and read out of the recording medium. However, an optical disk processor has a high error rate of a recording medium so that an ID section cannot be recognized in a certain case. Therefore, processing efficiency is greatly reduced since the optical disk processor transmits information indicative of disability of writing and reading operations of data to a host processor, etc. To solve this problem, for example, an optical disk processor proposed and shown in Japanese Patent Application Laying Open (KOKAI) No. 58-215734 has means for recognizing a predetermined sector address indicative of a position of data in a format in which addresses are sequentially formed on an optical disk medium in advance. This optical disk processor further has means for recognizing sector addresses before and after the above predetermined sector address. When the above predetermined sector address cannot be recognized, but the sector addresses before and after the predetermined sector address can be recognized, the data are written and read out of the optical disk in accordance with the above format by sequentially judging the sector addresses before and after the predetermined sector address. Namely, if ID sections before and after an ID section (address recognizing section) of a specified sector can be recognized even when no ID section of the specified sector can be recognized, an address of the unrecognized ID section is detected by sequentially using addresses of the recognized ID sections. However, when the address of a certain sector is not recognized, it is necessary to confirm sector addresses just before and after this unrecognized address. Therefore, reading and writing processings cannot be performed while an optical head passes through the sector of the unrecognized address. The reading and writing processings can be performed after the sector addresses just before and after the unrecognized address are confirmed and the optical disk is rotated 360 degrees and the optical head again reaches the sector of the unrecognized address. Therefore, the general optical disk processor has a problem that processing speeds of the reading and writing operations are greatly reduced.

Further, in the general optical disk processor, it is necessary to make a pre-format in the ID section with respect to address information and an error detecting code so as to judge whether an address is correctly recognized or not. Therefore, in the general optical disk processor, redundancy is increased by the error detecting code so that a memory capacity of the entire disk is reduced.

SUMMARY OF THE INVENTION

It is therefore an object of the present invention to provide an optical disk driving apparatus in which an address of a certain sector is judged to perform reading and writing processings without reducing processing speeds of reading and writing operations even when this sector address is not recognized, and an error in address section can be detected without additionally providing an error detecting code and redundancy is reduced to prevent the reduction of a memory capacity of an entire optical disk.

The above object of the present invention can be achieved by an optical disk driving apparatus using an optical disk in which a sector address in a set address sequence is sequentially provided in a pre-format in an address recognizing section of each sector, the optical disk driving apparatus comprising means for reading the sector address provided in the pre-format out of the optical disk; error detecting means for detecting an error in sector address read by the reading means; and means for setting a value of the read sector address as sector address data when there is no error in the read sector address; the setting means setting a value of the next sector address as the sector address data on the basis of the set address sequence from data of a sector address just before the read sector address when there is the error in the read sector address; the optical disk driving apparatus being constructed such that data are written and read out of the optical disk based on the sector address data.

The error detecting means judges the relation between the sector address read in the present sector and a sector address read in a sector located before the present sector by one or plural sectors, and detects the error in sector address by conformity and nonconformity between this relation and the set address sequence.

In accordance with the above structure, the address of a certain sector is judged to perform reading and writing processings without reducing processing speeds of reading and writing operations even when this sector address is not recognized. Further, an error in address section can be detected without additionally providing an error detecting code and redundancy is reduced to prevent the reduction of a memory capacity of the entire optical disk.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical disk driving apparatus in the present invention will next be described in detail with reference to the accompanying drawings.

Figure 1:
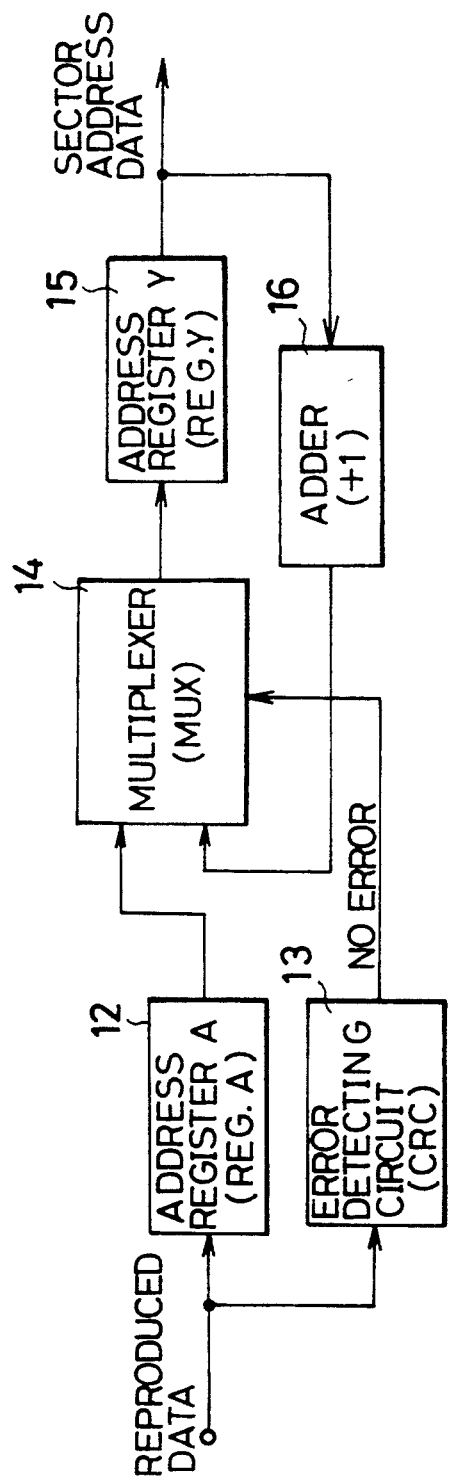
FIG. 1 is a view showing the construction of an optical disk driving apparatus in accordance with a first embodiment of the present invention.
Figure 3:
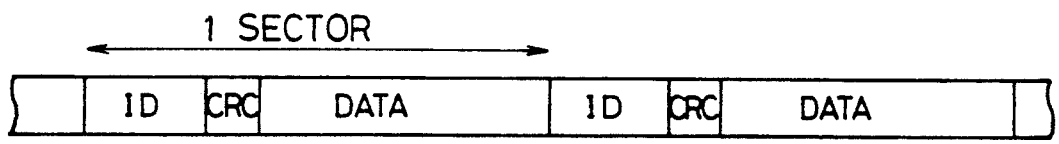
FIG. 3 is a view showing an example of a format of an optical disk.

FIG. 1 is a view showing the construction of an optical disk driving apparatus in accordance with a first embodiment of the present invention. In this figure, reference numerals 12, 13 and 14 respectively designate an address register A (REG. A), an error detecting circuit (CRC) and a multiplexer (MUX). Reference numerals 15 and 16 respectively designate an address register Y (REG. Y) and an adder (+1). FIG. 3 shows an example of a format of an optical disk used in the optical disk driving apparatus in the first embodiment. The optical disk includes an ID section having a sector address, an error detecting code section (CRC) for detecting an error in sector address, and a data section (DATA).

In a sector address detector shown in FIG. 1, reproduced data from the optical disk are inputted to the address register A (REG. A) 12 and the error detecting circuit (CRC) 13. The address register 12 extracts and holds only data of the ID section as an address recognizing section with respect to the reproduced data from the optical disk. Namely, the address register 12 extracts and holds only a sector address of the ID section. Data of the ID section and the error detecting code section with respect to the reproduced data are inputted to the error detecting circuit 13. The error detecting circuit 13 judges whether or not an error in sector address is caused in the ID section. When there is no error in sector address, the error detecting circuit 13 outputs a signal indicative of NO ERROR.

When there is no error in sector address after the judgment of the error detecting circuit 13, the sector address held in the address register 12 is transferred by the multiplexer (MUX) 14 to the address register 15. In contrast to this, when there is an error in sector address after the judgment of the error detecting circuit 13, an address value obtained by adding value 1 to an address value of output data of the address register Y (REG. Y) 15 using the adder 16 is transferred by the multiplexer (MUX) 14 to the address register 15. The above sector address held in the address register 12 and the above address value obtained by the adding operation of the adder 16 are selectively transferred by the multiplexer 14 to the address register 15.

Accordingly, when there is no error in sector address, the address register 15 outputs a sector address reproduced by the ID section. In contrast to this, when there is an error in sector address, the address register 15 outputs an address value obtained by adding value 1 to an address value of output data of the address register 15 with respect to a sector just before the sector indicative of the error.

For example, when sector address 3 is reproduced without error in the ID section of a sector of address 3, this sector address 3 is obtained as an output of the address register 15.

When the error in the ID section of a sector of address 4 is caused, sector address 4 obtained by adding value 1 to the address value 3 of the address register 15 just before the sector address 4 is obtained as the output of the address register 15. Thus, in the first embodiment of the present invention, when an error in the ID section of a certain sector is caused, it is possible to judge the sector address without confirming a subsequent sector address as in the general optical disk driving apparatus.

Such a judged sector address has a sufficiently high reliability.

For example, in the above case, the address value 4 obtained by adding value 1 to the address value 3 of the address register 15 is considered to have a reliability equal to that of the address value 3 before this sector address 4 since it is judged that there is no error in the address value 3 by the error detection with high reliability.

Figure 2:
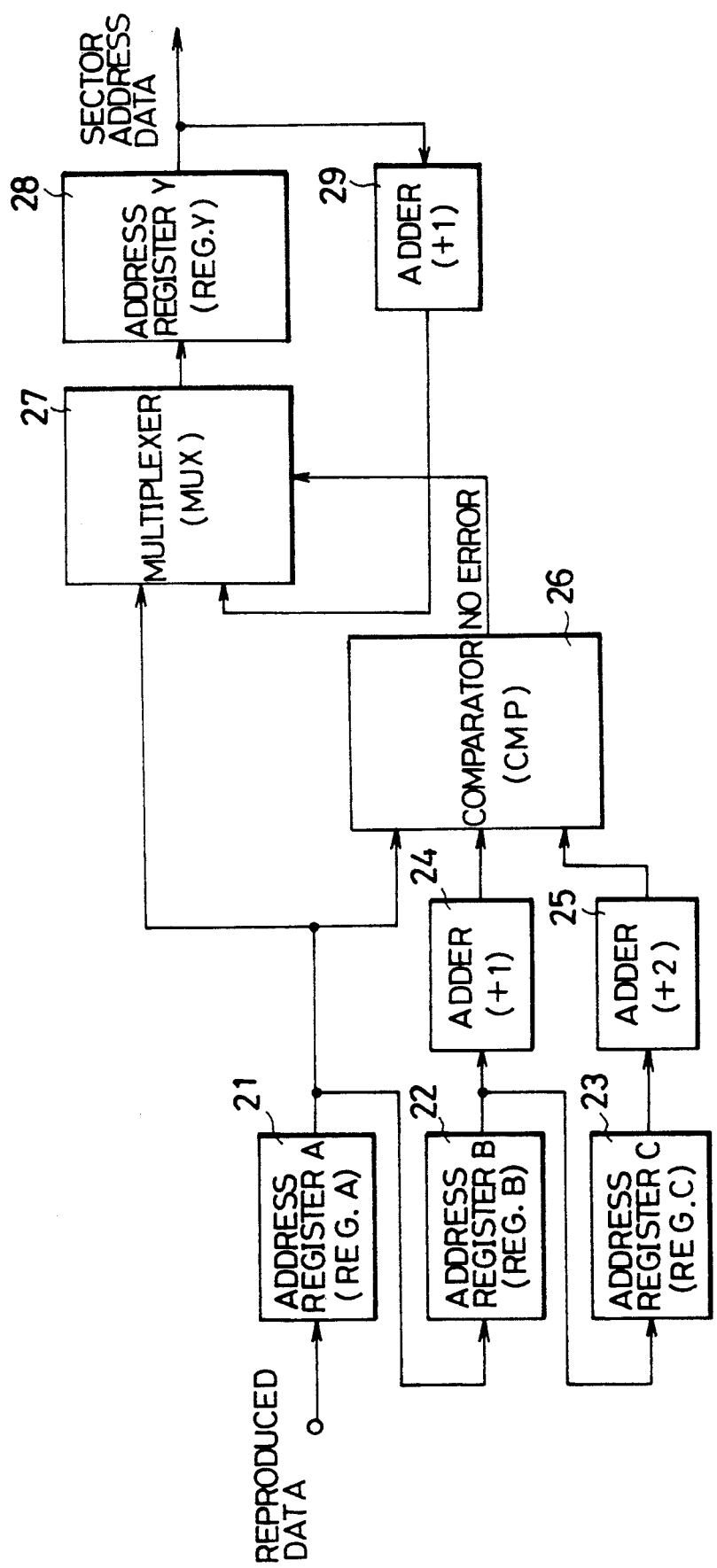
FIG. 2 is a view showing the construction of an optical disk driving apparatus in accordance with a second embodiment of the present invention.
Figure 4:
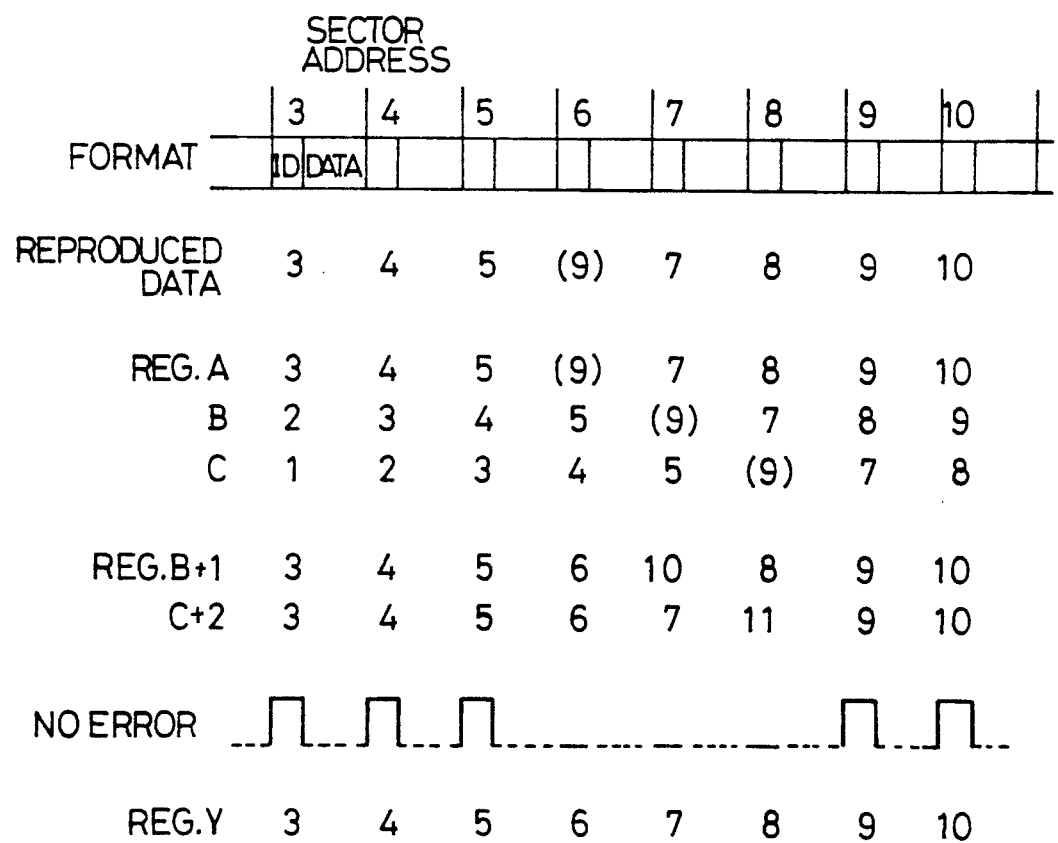
FIG. 4 is a view showing another example of the format of the optical disk and an operating example thereof.

FIG. 2 is a view showing the construction of an optical disk driving apparatus in accordance with a second embodiment of the present invention. In this figure, reference numerals 21, 22 and 23 respectively designate an address register A (REG. A), an address register B (REG. B) and an address register C (REG. C). Reference numerals 24, 25 and 26 respectively designate an adder (+1), an adder (+2) and a comparator (CMP). Reference numerals 27, 28 and 29 respectively designate a multiplexer (MUX), an address register Y and an adder (+1). A format of an optical disk used in this second embodiment may be constructed as shown in FIG. 3. However, this format may be constructed such that the format has no error detecting code (CRC) as shown in FIG. 4.

In a sector address detector shown in FIG. 2, reproduced data from the optical disk are inputted to the address register A (REG. A) 21. The address register 21 extracts and holds only data of an ID section with respect to the reproduced data from the optical disk. Namely, the address register 21 extracts and holds only a sector address of the ID section. Before a reproducing operation with respect to the ID section, data contents of the address register 22 are transferred to the address register 23 and data contents of the address register 21 are transferred to the address register 22. Namely, when the reproducing operation with respect to the ID section of a certain sector is completed, a sector address reproduced in the ID section of this certain sector is held in the address register 21. A sector address reproduced in the ID section of a sector just before the certain sector is held in the address register 22. Further, a sector address reproduced in the ID section of a sector located before the certain sector by two sectors is held in the address register 23.

The data contents of the address register 21 are inputted to the comparator (CMP) 26. An address value obtained by adding value 1 to an address value indicative of the data contents of the address register 22 using the adder 24 is inputted to the comparator (CMP) 26. Further, an address value obtained by adding value 2 to an address value indicative of the data contents of the address register 23 using the adder 25 is inputted to the comparator (CMP) 26. The comparator (CMP) 26 outputs a signal indicative of NO ERROR when these three address values with respect to the address registers 21, 22 and 23 are equal to each other. Namely, this signal indicative of NO ERROR is outputted when sector addresses reproduced in the ID section of a sector located before the present sector by two sectors, the ID section of a sector just before the present sector, and the ID section of the present sector show continuous values such as 3, 4 and 5, respectively.

When the reproduced sector addresses show the continuous values after the above three address values are completely compared with each other by the comparator 26, the sector address held in the address register 21 is transferred to the address register 28 by the multiplexer (MUX) 27. In contrast to this, when the reproduced sector addresses do not show the continuous values, an address value obtained by adding value 1 to an address value indicative of an output of the address register 28 using the adder 29 is transferred to the address register 28 by the multiplexer (MUX) 27. The above sector address held in the address register 21 and the above address value obtained by the adder 29 are selectively transferred to the address register 28 by the multiplexer (MUX) 27.

Accordingly, the address register 28 outputs a sector address reproduced in the ID section of the present sector when the sector addresses reproduced in the ID section of the sector located before the present sector by two sectors, the ID section of the sector just before the present sector, and the ID section of the present sector show continuous values. In contrast to this, the address register 28 outputs an address value obtained by adding value 1 to an address value indicative of an output of the address register 28 with respect to the sector just before the present sector when the sector addresses reproduced in the ID section of the sector located before the present sector by two sectors, the ID section of the sector just before the present sector, and the ID section of the present sector do not show the continuous values.

For example, as shown in FIG. 4, an operating example of sectors from address 3 to address 10 will next be explained in the following description. It is assumed that preceding sector addresses 1 and 2 are reproduced without error. Further, it is assumed that there is an error in sector address reproduced in the ID section of a sector of address 6 and this sector address 6 is incorrectly reproduced as address 9 and there is no error in address with respect to the other sectors.

For example, with respect to a sector of address 5, a sector address reproduced in the ID section of the present sector shows value 5. A sector address reproduced in the ID section of a sector just before the present sector shows value 4. A sector address reproduced in the ID section of a sector located before the present sector by two sectors shows value 3. These values 5, 4 and 3 are respectively shown by data contents of the address registers (REG. A; REG. B; REG. C) 21, 22 and 23. An address value indicative of the data contents of the address register 21 is equal to value 5. An address value obtained by adding value 1 to an address value indicative of the data contents of the address register 22 is also equal to value 5. Further, an address value obtained by adding value 2 to an address value indicative of the data contents of the address register 23 is also equal to value 5. Accordingly, it is understood that the sector addresses reproduced in the ID section of the sector located before the present sector by two sectors, the ID section of the sector just before the present sector, and the ID section of the present sector show continuous values.

Thus, in the second embodiment of the present invention, there is no error in sector address when the reproduced sector addresses show continuous values. In this case, the address value 5 reproduced in the ID section of the present sector is transferred to the address register 28.

With respect to the sector of address 6, there is an error in sector address reproduced in the ID section of the present sector and this sector address shows value 9. A sector address reproduced in the ID section of a sector just before the present sector shows value 5. A sector address reproduced in the ID section of a sector located before the present sector by two sectors shows value 4. It is understood that these values 9, 5 and 4 are not constructed by continuous values by processings similar to the above-mentioned processings.

Thus, in the second embodiment, there is an error in sector address when the reproduced sector addresses do not show continuous values. In this case, value 1 is added to the address value 5 of the address register 28 with respect to the sector just before the present sector, and the added address value 6 is transferred to the address register 28. Accordingly, it is possible to judge an original address even when an error in address is caused in the ID section of a certain sector. For example, in the above case, it is possible to judge the original address 6 even when address 6 is changed to address 9 by the error in address.

Further, in the second embodiment, the error in address is detected by continuity of the reproduced sector addresses without detecting an error in error detecting code. Accordingly, it is not necessary to provide the error detecting code on the disk.

Further, the error in address is detected by the continuity of such reproduced sector addresses with very high reliability. The error in address cannot be detected only in a case in which there is an error in each of sector addresses reproduced in the ID sections of three continuous sectors so that these sector addresses show continuous values different from predetermined continuous values. For example, the error in address cannot be detected when the sector addresses show continuous values 10, 11 and 12 different from the predetermined continuous values 3, 4 and 5. However, the probability of such a case is very small. For example, when a word error rate is set to $10^{-4}$, the above probability is equal to a value less than $10^{-12}$, thereby providing a sufficiently high reliability in the detection of the error in sector address.

As mentioned above, the present invention has the following effects.

(1) When a sector address is detected without error at least one time, it is possible to provide an address of a predetermined sector without confirming a sector address just after the address of the predetermined sector even when an error in address is caused in the subsequent sectors. Accordingly, it is possible to judge the address of the predetermined sector and perform reading and writing processings without reducing processing speeds in the optical disk driving apparatus. Such effects cannot be obtained in the general optical disk driving apparatus.

(2) The error in address is detected with very high reliability by continuity of reproduced sector addresses without detecting an error in error detecting code. Accordingly, it is not necessary to provide the error detecting code (CRC) on an optical disk. Therefore, it is possible to prevent the reduction of a memory capacity of the entire disk.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical disk driving apparatus using an optical disk in which a sector address in a predetermined address sequence is sequentially preformatted in an address field of each sector, said optical disk driving apparatus comprising:

a data reproducing means for reproducing data recorded on the optical disk and for outputting a first signal representing said reproduced data;

a first sector address register means for receiving said first signal from said data reproducing means, extracting said sector address from said received first signal, and storing said extracted sector address;

an error judging means for judging whether or not there is an error in said sector address stored in said first sector address register means;

a multiplexer means for receiving a second signal representing said stored sector address from said first sector address register means, and for outputting said received second signal in a case where no error is detected by said error judging means;

a second sector address register means for receiving said second signal outputted from said multiplexer means, and for storing said received second signal, said second sector address register means being so constructed as to output a third signal stored therein; and a sector address increasing means for receiving said third signal from said second sector address register means, for increasing a sector address stored in said second sector address register means by one, and for outputting a fourth signal corresponding to a sector address of a sector subsequent to a sector represented by said third signal in said predetermined address sequence, said multiplexer means transferring said fourth signal from said sector address increasing means to said second sector address register means in a case where an error in said stored sector address is detected by said error judging means, said second sector address register means storing said transferred fourth signal and outputting said stored fourth signal as said third signal in a case where an error in said stored sector address is detected by said error judging means, the optical disk driving apparatus being constructed such that data are written to and read out from the optical disk on the basis of said third signal.

2. An optical disk driving apparatus according to claim 1, wherein said error judging means is so adapted as to detect the error by judging an agreement of a first relation in said predetermined address sequence with a second relation between the sector address corresponding to said present sector and a sector address corresponding to one or plural sectors located before said present sector.

3. A method of operating an optical disk driving apparatus using an optical disk in which a sector address in a predetermined address sequence is sequentially preformatted in an address field of each sector, said method comprising the steps of:

reproducing data recorded on the optical disk and outputting a first signal representing said reproduced data;

receiving said first signal from said data reproducing means, extracting said sector address from said received first signal, and storing said extracted sector address in a first address register means;

detecting whether or not there is an error in said sector address stored in said first sector address register means;

receiving at a multiplexing circuit a second signal representing said stored sector address from said first sector address register means, and outputting said received second signal from said multiplexing circuit in a case where no error is detected in said detecting step;

receiving said second signal and storing said received second signal at a second sector address register means, said second address register means being so constructed as to output a third signal stored therein; and receiving said third signal from said second sector address register means, increasing a sector address stored in said second sector address register means by one, and outputting a fourth signal corresponding to a sector address of a sector subsequent to a sector represented by said third signal in said predetermined address sequence;

transferring said fourth signal from said sector address increasing means to said second sector address register means in a case where an error in said stored sector address is detected in said detecting step;

said second sector address register means storing said transferred fourth signal and outputting said stored fourth signal as said third signal in a case where an error in said stored sector address is detected in said determining step;

the optical disk driving apparatus being operated such that data are written to and read out from the optical disk on the basis of said third signal.

* * * * *